United States Patent
Dang

(10) Patent No.: US 8,255,712 B2
(45) Date of Patent: Aug. 28, 2012

(54) COMPUTING DEVICE AND METHOD FOR PROTECTING A POWER BUTTON OF THE COMPUTING DEVICE

(75) Inventor: De-Hua Dang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 287 days.

(21) Appl. No.: 12/701,722

(22) Filed: Feb. 8, 2010

(65) Prior Publication Data
US 2011/0055601 A1    Mar. 3, 2011

(30) Foreign Application Priority Data

Aug. 31, 2009    (CN) .......................... 2009 1 0306366

(51) Int. Cl.
  *G06F 1/00*    (2006.01)
(52) U.S. Cl. ........................................ 713/310; 713/300
(58) Field of Classification Search .................. 713/310, 713/300
See application file for complete search history.

(56) References Cited

U.S. PATENT DOCUMENTS

| | | | | |
|---|---|---|---|---|
| 5,506,990 | A * | 4/1996 | Holman, Jr. ................... | 713/300 |
| 5,918,059 | A * | 6/1999 | Tavallaei et al. .............. | 713/300 |
| 5,925,131 | A * | 7/1999 | Novoa et al. .................. | 713/300 |
| 6,587,951 | B1 * | 7/2003 | Flanigan ........................ | 713/310 |
| 7,185,187 | B2 * | 2/2007 | Pelkey et al. ..................... | 713/1 |
| 7,240,222 | B1 * | 7/2007 | Falik et al. ..................... | 713/300 |
| 7,380,144 | B2 * | 5/2008 | Green et al. .................. | 713/310 |
| 7,987,377 | B2 * | 7/2011 | Fu ................................ | 713/310 |
| 2001/0049783 | A1 * | 12/2001 | Chen .................................. | 713/1 |
| 2004/0139357 | A1 * | 7/2004 | Lee ................................ | 713/300 |
| 2010/0064126 | A1 * | 3/2010 | Yi et al. ............................ | 713/2 |

* cited by examiner

*Primary Examiner* — Chun Cao
(74) *Attorney, Agent, or Firm* — Altis Law Group, Inc.

(57) ABSTRACT

A method protects a power button of a computing device. The computing device includes a front panel and a motherboard. The front panel includes a protection switch and a power button. The motherboard includes a power protection unit that displays a power-on simulation icon and a power-off simulation icon on a display screen when the power button is pressed. The power protection unit controls a general-purpose input/output (GPIO) pin of the motherboard to output a first voltage level when the power-off simulation icon is selected, and shuts off the protection switch to enable the power button according to the first voltage level. The power protection unit controls the GPIO pin to output a second voltage level when the power-on simulation icon is selected, and turns on the protection switch to enable the power button according to the second voltage level.

15 Claims, 3 Drawing Sheets

COMPUTING DEVICE AND METHOD FOR PROTECTING A POWER BUTTON OF THE COMPUTING DEVICE

BACKGROUND

1. Technical Field

Embodiments of the present disclosure relate generally to electronic devices, and more particularly to a computing device and a method for protecting a power button of the computing device.

2. Description of Related Art

A power button is usually disposed at front panel of a computing device (e.g., a computer, or a server), however, the power button may be accidentally touched, thereby leading to unexpected shutdown of the computing device. To reduce such a risk, the power button can be disabled in BIOS, that may cause functions of other buttons disposed at the front panel of the computing device to be also disabled at the same time. Under some special circumstances where a computing device needs to be shut down and then restarted, the computing device must be restarted so as to enable the power button in BIOS. Then, the computing device can be shut down and started again by pressing the power button. The above-described complicated processes are not convenient for users to conduct operation.

Accordingly, there is a need for an improved method for protecting a power button of the computing device, so as to overcome the above-mentioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
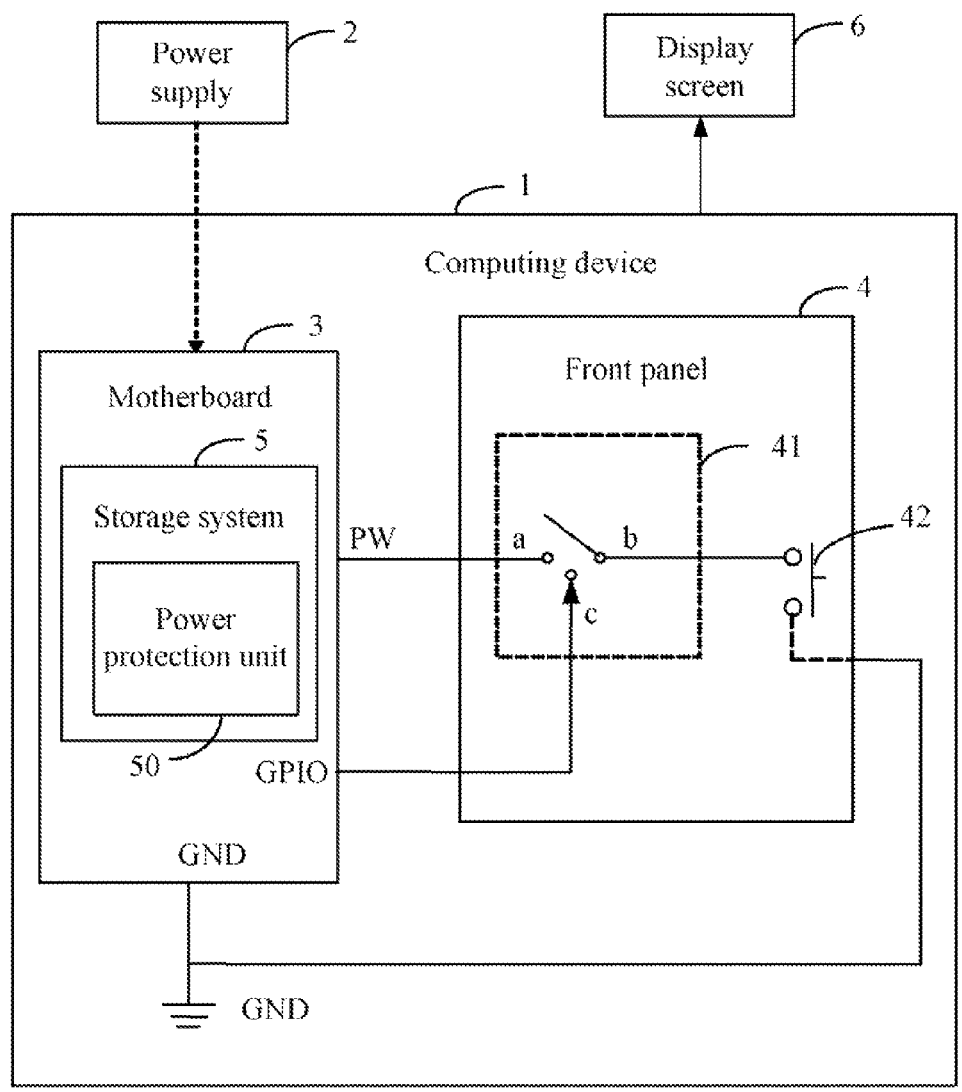
FIG. 1 is a schematic diagram of one embodiment of a computing device.

FIG. 1 is a schematic diagram of one embodiment of a computing device 1. It should be apparent that FIG. 1 is only one example of an architecture for the computing device 1 that can be included with more or fewer components than shown, or a different configuration of the various components in other embodiments. In one embodiment, the computing device 1 may include a motherboard 3 and a front panel 4. The motherboard 3 includes a storage system 5, such as a random access memory (RAM) for temporary storage of information, and/or a read only memory (ROM) for permanent storage of information. The storage system 5 includes a power protection unit 50 that may be composed of one or more software instructions or computerized codes, which can be executed by at least one processor of the computing device 1. The computing device 1 may be, a desktop, a laptop, or a server, for example.

The front panel 4 includes a protection switch 41 and a power button 42. In one embodiment, the protection switch 41 may be disposed on the back of the front panel 4, and the power button 42 may be enchased on the front panel 4. The protection switch 41 includes an input port (denoted as input port "a"), an output port (denoted as output port "b"), and a control port (denoted as control port "c"). The protection switch 41 connects to the power button 42 through output port "b".

The motherboard 3 may further include a plurality of control pins, such as a power (PW) pin, a general-purpose input/output (GPIO) pin, and a ground (GND) pin. In the embodiment, the PW pin connects to the input port "a" of the protection switch 41, the GPIO pin connects to the control pin "c" of the protection switch 41, and the GND pin connects to a GND port of the power button 42.

The power protection unit 50 is operable to display a power-on simulation icon and a power-off simulation icon on the display screen 6 when the power button 42 is pressed. The power protection unit 50 is further operable to turn on the protection switch 41 to enable the power button 42 when the power-on simulation icon is selected, and shut off the protection switch 41 to disable the power button 42 when the power-off simulation icon is selected.

The motherboard 4 may further connect to a power supply 2, and a display screen 6. The power supply 2 is used to supply power to the device 1. The display screen 6 is used to display the power-on simulation icon and the power-off simulation icon when the power button 42 of the front panel 4 is pressed. In one embodiment, the power button 42 is enabled when a user selects/touches the power-on simulation icon on the display screen 6. In contrast, the power button 42 of the front panel 4 is disabled when the user selects/touches the power-off simulation icon on the display screen 6. As such, the power button 42 can be protected from an accidental touch when the power-on simulation icon is selected, thereby reducing the risk of unexpected shutdown of the computing device 1.

Figure 2:
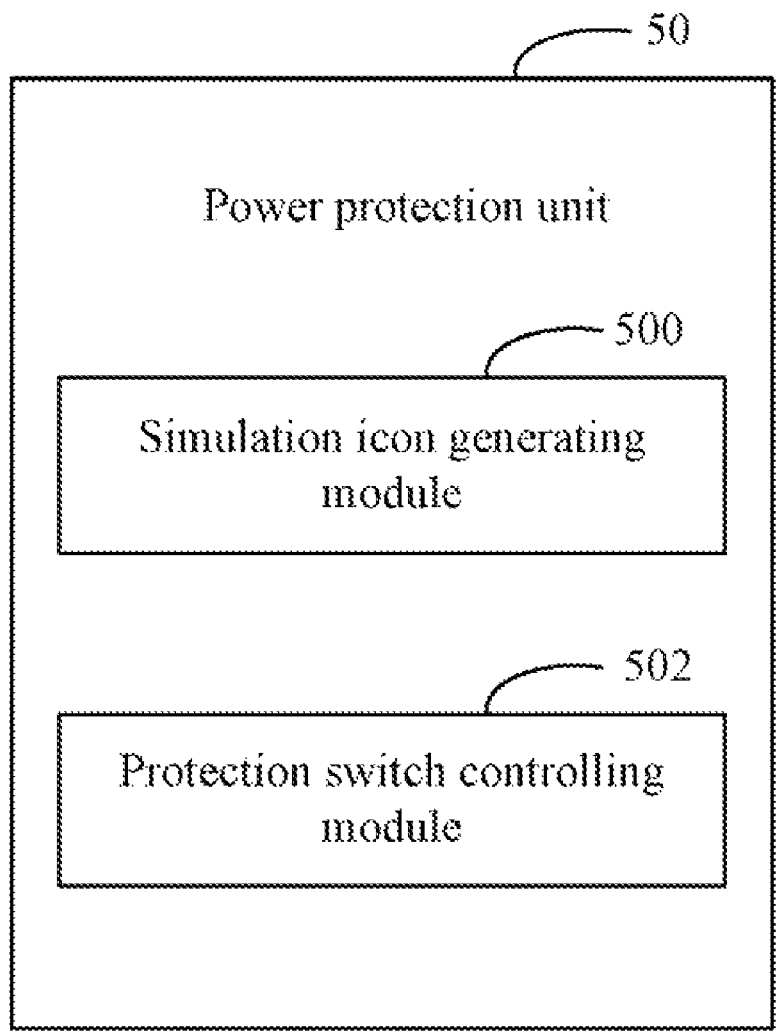
FIG. 2 is a block diagram of function modules of a power protection unit of the computing device in FIG. 1.

FIG. 2 is a block diagram of function modules of the power protection unit 50 in FIG. 1. In one embodiment, the power protection unit 50 may include a simulation icon generating module 500, and a protection switch controlling module 502. One or more computerized codes of the function modules may be stored in the storage system 5 and executed by at least one processor of the computing device 1. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The simulation icon generating module 500 is operable to display a power-on simulation icon and a power-off simulation icon on the display screen 6 when the power button 42 is pressed. The user can select one of the two simulation icons on the display screen 6 to determine whether or not to protect the power button 42 from an accidental touch. For example, if the power-on simulation icon is selected, the power button 42 performs a normal-power on or power-off function. If the power-off simulation icon is selected, the power button 42 can be protected the from an accidental touch.

The protection switch controlling module 502 is operable to control the GPIO pin of the motherboard 3 to output a first voltage level when the power-off simulation icon is selected, and control the GPIO pin of the motherboard 3 to output a second voltage level when the power-on simulation icon is selected. In one embodiment, the first voltage level may be a low voltage for shutting off the protection switch 41, such as 0 volts, for example. The second voltage level may be a high voltage for turning on the protection switch 41, such as 5 volts, for example. The protection switch controlling module 502 is operable to shut off the protection switch 41 to disable the power button 42 according to the first voltage level, and turn on the protection switch 41 to enable the power button 42 according to the second voltage level.

Figure 3:
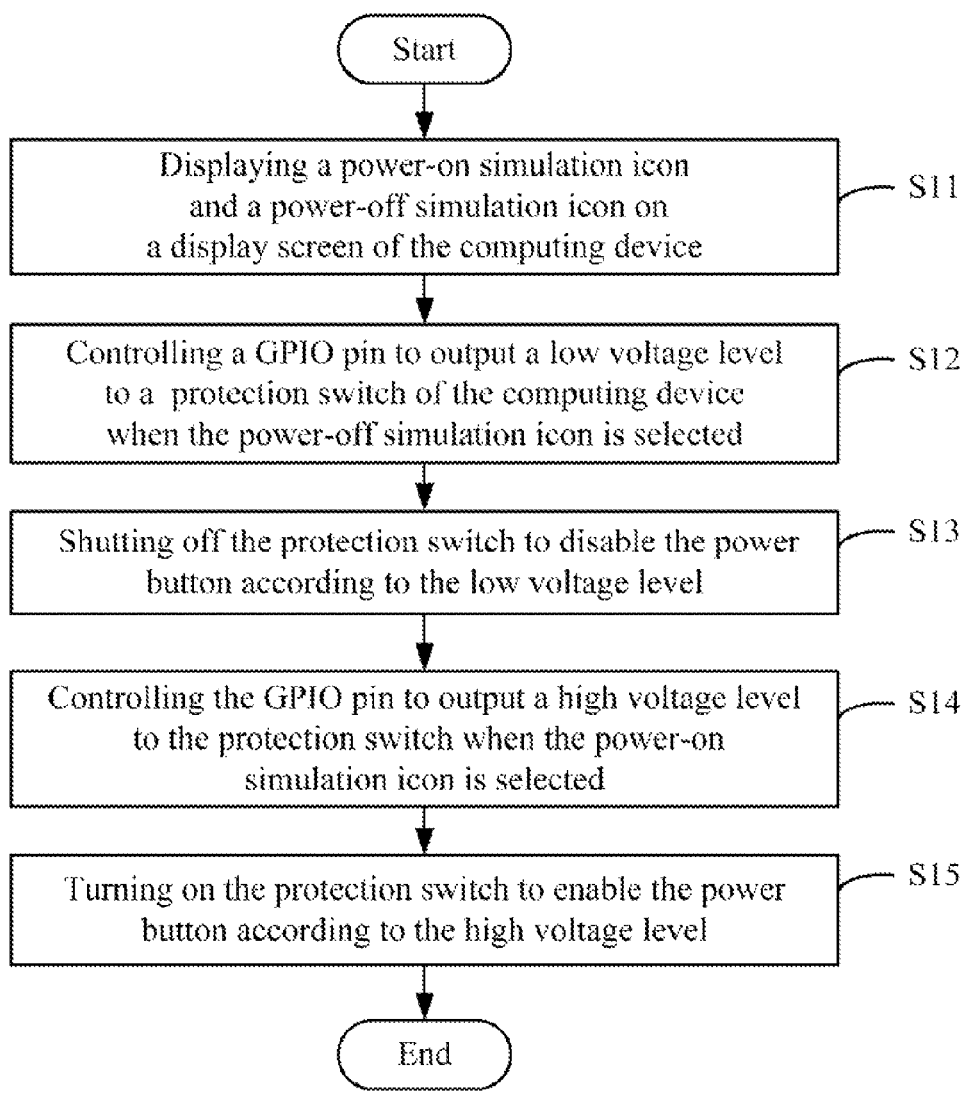
FIG. 3 is a flowchart of one embodiment of a method for protecting a power button of the computing device in FIG. 1.

FIG. 3 is a flowchart of one embodiment of a method for protecting a power button of the computing device 1 as described in FIG. 1. Depending on the embodiment, additional blocks may be added, others removed, and the ordering of the blocks may be changed.

In block S11, the simulation icon generating module 500 displays a power-on simulation icon and a power-off simulation icon on the display screen 6 when the power button 42 of the computing device 1 is pressed. The user can select one of the two simulation icons on the display screen 6 to determine whether or not to protect the power button 42 from an accidental touch. For example, if the power-on simulation icon is selected, the power button 42 can perform a normal power-on or power-off function. If the power-off simulation icon is selected, the power button 42 can be protected from an accidental touch during the execution process of the computing device 1.

In block S12, the protection switch controlling module 502 controls the GPIO pin of the motherboard 3 to output a first voltage level to the protection switch 41 when the power-off simulation icon is selected. The first voltage level may be a low voltage, such as 0 volt, for example. In block S13, the protection switch controlling module 502 shuts off the protection switch 41 to disable the power button 42 according to the first voltage level. As such, the power button 42 can be protected from an accidental touch during the execution process of the computing device 1, so as to reduce the risk of unexpected shutdown of the computing device 1.

In block S14, the protection switch controlling module 502 controls the GPIO pin of the motherboard 3 to output a second voltage level to the protection switch 41 when the power-on simulation icon is selected. In one embodiment, the second voltage level may be a high voltage, such as 5 volts, for example. In block S15, the protection switch controlling module 502 turns on the protection switch 41 to enable the power button 42 according to the second voltage level. As such, the power button 42 can perform a normal power-on or power-off function during the execution process of the computing device 1.

All of the processes described above may be embodied in, and fully automated via, functional code modules executed by one or more general purpose processors of the computing device 1. The functional code modules may be stored in any type of readable medium or other storage devices. Some or all of the methods may alternatively be embodied in specialized computing devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a front panel comprising a protection switch and a power button; and
   a motherboard being connected to the front panel, the motherboard comprising a power protection unit stored in a storage system, the power protection unit comprising:
   a simulation icon generating module operable to display a power-on simulation icon and a power-off simulation icon on a display screen when the power button is pressed, wherein the power button is enabled when the power-on simulation icon is selected, and the power button is disabled when the power-off simulation icon is selected; and
   a protection switch controlling module operable to control a general-purpose input/output (GPIO) pin of the motherboard to output a first voltage level to the protection switch when the power-off simulation icon is selected and shut off the protection switch to disable the power button according to the first voltage level, and control the GPIO pin to output a second voltage level to the protection switch when the power-on simulation icon is selected and turn on the protection switch to enable the power button according to the second voltage level.

2. The computing device according to claim 1, wherein the protection switch connects to the power button through an output port of the protection switch, and connects to the motherboard through an input port of the protection switch and a control pin of the protection switch.

3. The computing device according to claim 2, wherein the motherboard further comprises a power (PW) pin for connecting to the input port of the protection switch, and a ground (GND) pin for connecting to a GND port of the power button.

4. The computing device according to claim 2, wherein the GPIO pin of the motherboard connects to the control pin of the protection switch.

5. The computing device according to claim 1, wherein the first voltage level is a low voltage for shutting off the protection switch, and the second voltage level is a high voltage for turning on the protection switch.

6. A method for protecting a power button of a computing device, the computing device comprising a motherboard and a protection switch, the method comprising:
   displaying a power-on simulation icon and a power-off simulation icon on a display screen when the power button is pressed, wherein the power button is enabled when the power-on simulation icon is selected, and the power button is disabled when the power-off simulation icon is selected;
   controlling a general-purpose input/output (GPIO) pin of the motherboard to output a first voltage level to the protection switch when the power-off simulation icon is selected;
   shutting off the protection switch to disable the power button according to the first voltage level;
   controlling the GPIO pin of the motherboard to output a second voltage level to the protection switch when the power-on simulation icon is selected; and
   turning on the protection switch to enable the power button according to the second voltage level.

7. The method according to claim 6, wherein the first voltage level is a low voltage for shutting off the protection switch, and the second voltage level is a high voltage for turning on the protection switch.

8. The method according to claim 6, wherein the protection switch connects to the power button through an output port of the protection switch, and connects to the motherboard through an input port of the protection switch and a control pin of the protection switch.

9. The method according to claim 8, wherein the motherboard comprises a power (PW) pin for connecting to the input port of the protection switch, and a ground (GND) pin for connecting to a GND port of the power button.

10. The method according to claim 6, wherein the computing device is a desktop, a laptop, a notebook, or a server.

11. A storage medium having stored thereon instructions that, when executed by at least one processor of a computing device, cause the computing device to perform a method for protecting a power button of the computing device, the method comprising:

displaying a power-on simulation icon and a power-off simulation icon on a display screen when the power button is pressed, wherein the power button is enabled when the power-on simulation icon is selected, and the power button is disabled when the power-off simulation icon is selected;

controlling a general-purpose input/output (GPIO) pin of a motherboard of the computing device to output a first voltage level to a protection switch of the computing device when the power-off simulation icon is selected;

shutting off the protection switch to disable the power button according to the first voltage level;

controlling the GPIO pin of the motherboard to output a second voltage level to the protection switch when the power-on simulation icon is selected; and turning on the protection switch to enable the power button according to the second voltage level.

12. The storage medium according to claim 11, wherein the first voltage level is a low voltage for shutting off the protection switch, and the second voltage level is a high voltage for turning on the protection switch.

13. The storage medium according to claim 11, wherein the protection switch connects to the power button through an output port of the protection switch, and connects to the motherboard through an input port of the protection switch and a control pin of the protection switch.

14. The storage medium according to claim 13, wherein the motherboard comprises a power (PW) pin for connecting to the input port of the protection switch, and a ground (GND) pin for connecting to a GND port of the power button.

15. The storage medium according to claim 11, wherein the computing device is a desktop, a laptop, a notebook, or a server.

* * * * *